(12) United States Patent
Burnett

(10) Patent No.: US 9,364,777 B2
(45) Date of Patent: Jun. 14, 2016

(54) APPARATUS AND METHOD FOR SEPARATING SOLIDS FROM A SOLIDS LADEN DRILLING FLUID

(75) Inventor: George Alexander Burnett, Aberdeenshire (GB)

(73) Assignee: National Oilwell Varco, L.P., Houston, TX (US)

( * ) Notice: Subject to any disclaimer, the term of this patent is extended or adjusted under 35 U.S.C. 154(b) by 49 days.

(21) Appl. No.: 14/233,123

(22) PCT Filed: Apr. 23, 2012

(86) PCT No.: PCT/GB2012/050890
§ 371 (c)(1),
(2), (4) Date: Mar. 17, 2014

(87) PCT Pub. No.: WO2013/011265
PCT Pub. Date: Jan. 24, 2013

(65) Prior Publication Data
US 2014/0190905 A1  Jul. 10, 2014

(30) Foreign Application Priority Data

Jul. 15, 2011  (GB) .................................. 1112193.6

(51) Int. Cl.
*B01D 33/00* (2006.01)
*E21B 21/06* (2006.01)
(Continued)

(52) U.S. Cl.
CPC .............. *B01D 33/0003* (2013.01); *B07B 1/46* (2013.01); *E21B 21/065* (2013.01); *B01D 33/008* (2013.01); *B01D 33/0376* (2013.01)

(58) Field of Classification Search
CPC .............. B07B 1/24; B07B 1/48; B07B 1/46; B07B 1/55; B07B 13/16; B01D 33/0003; B01D 33/0376; B01D 33/41; B01D 33/008; B08B 15/02; E21B 21/065
See application file for complete search history.

(56) References Cited

U.S. PATENT DOCUMENTS 4,350,591 A * 9/1982 Lee ........................ B01D 33/03
                                                    210/384
5,265,730 A    11/1993 Norris et al.
2007/0163927 A1  7/2007 Eia
(Continued)

FOREIGN PATENT DOCUMENTS

GB      1526663       9/1978
GB      1578948       11/1980
(Continued)

OTHER PUBLICATIONS

International Search Report for PCT Patent Application No. PCT/GB2012/050890 dated Jun. 21, 2012, 3 pages.

*Primary Examiner* — Katherine Zalasky
*Assistant Examiner* — Benjamin Lebron
(74) *Attorney, Agent, or Firm* — JL Salazar Law Firm

(57) ABSTRACT

An apparatus for separating solids from solids laden drilling fluid, the apparatus comprising a skid and a basket resiliently suspended thereto and a vibratory mechanism to vibrate the basket, the basket having at least one screen deck for receiving at least one screen, the basket having a feed end at which solids laden drilling fluid is introduced and a discharge end at which solids are discharged through a solids discharge opening, the apparatus further comprising a hood encompassing at least a discharge end of the basket and at least one extraction outlet arranged at the discharge end to remove fume laden air from the basket.

16 Claims, 5 Drawing Sheets

(51) Int. Cl.
   *B07B 1/46* (2006.01)
   *B01D 33/03* (2006.01)

(56) References Cited

U.S. PATENT DOCUMENTS

2007/0294985 A1* 12/2007 Leseman et al. ............. 55/385.2
2008/0078699 A1    4/2008 Carr
2008/0078700 A1    4/2008 Jones et al.
2010/0196129 A1*  8/2010 Buckner ................. E02F 3/94
                                                              414/467

FOREIGN PATENT DOCUMENTS

| GB | 2176424    | 12/1986 |
| WO | 9633792    | 10/1996 |
| WO | 9816328    | 4/1998  |
| WO | 2006098638 | 9/2006  |

* cited by examiner

Fig. 1A
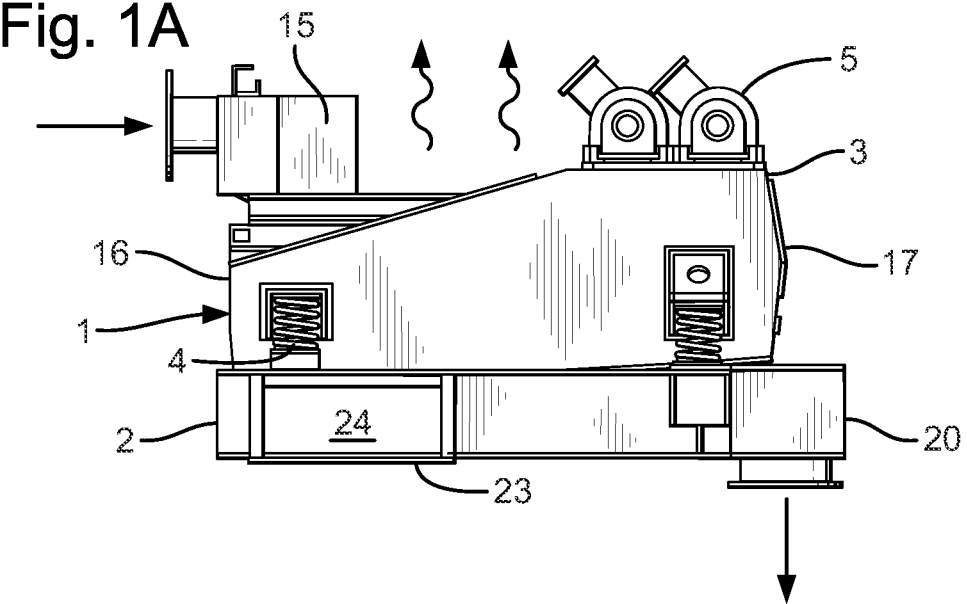
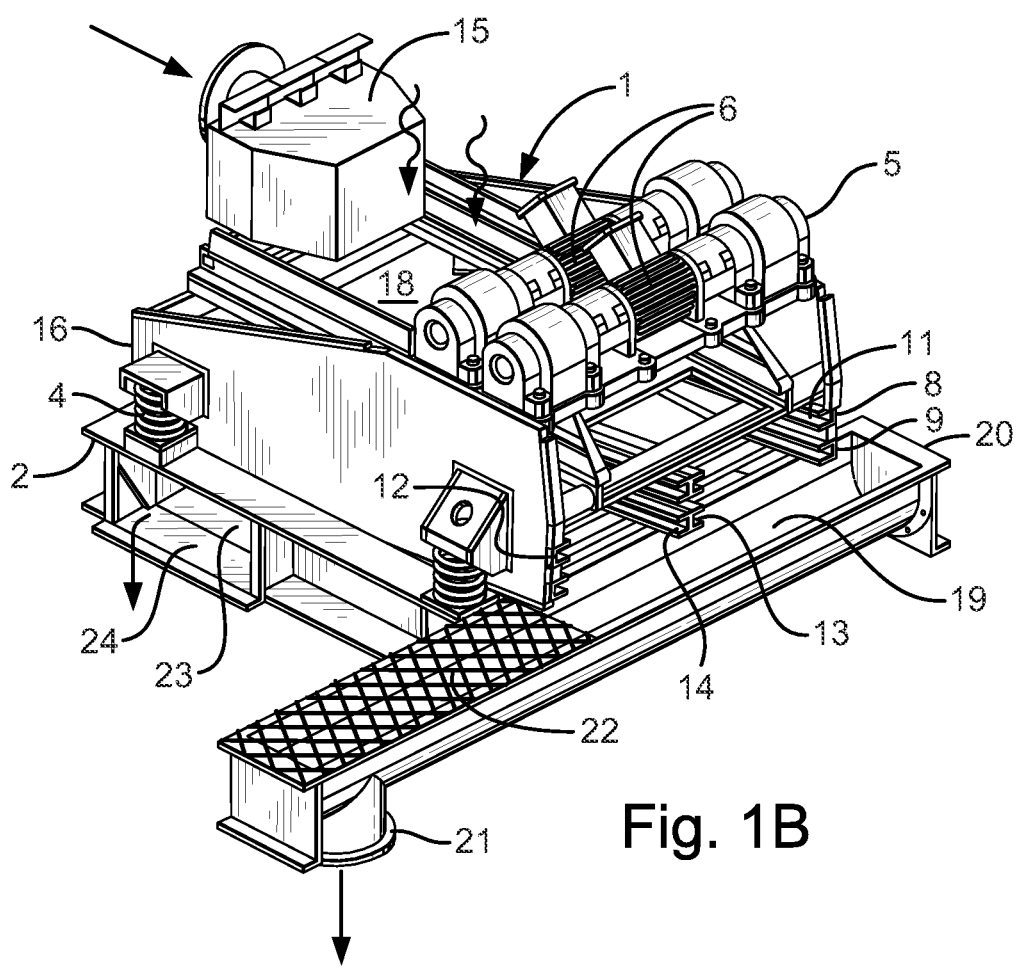
Fig. 1B

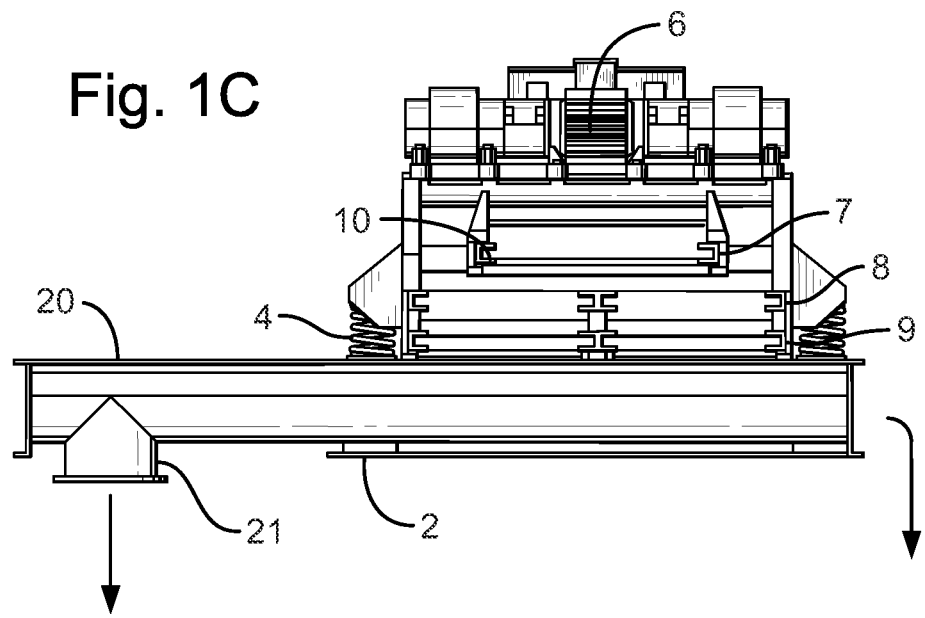
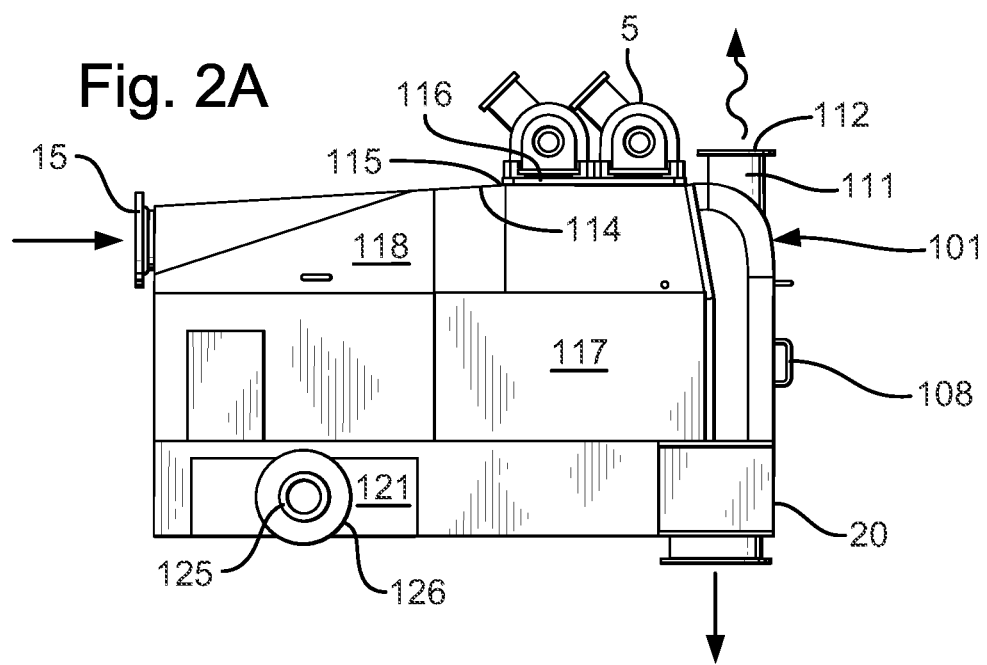

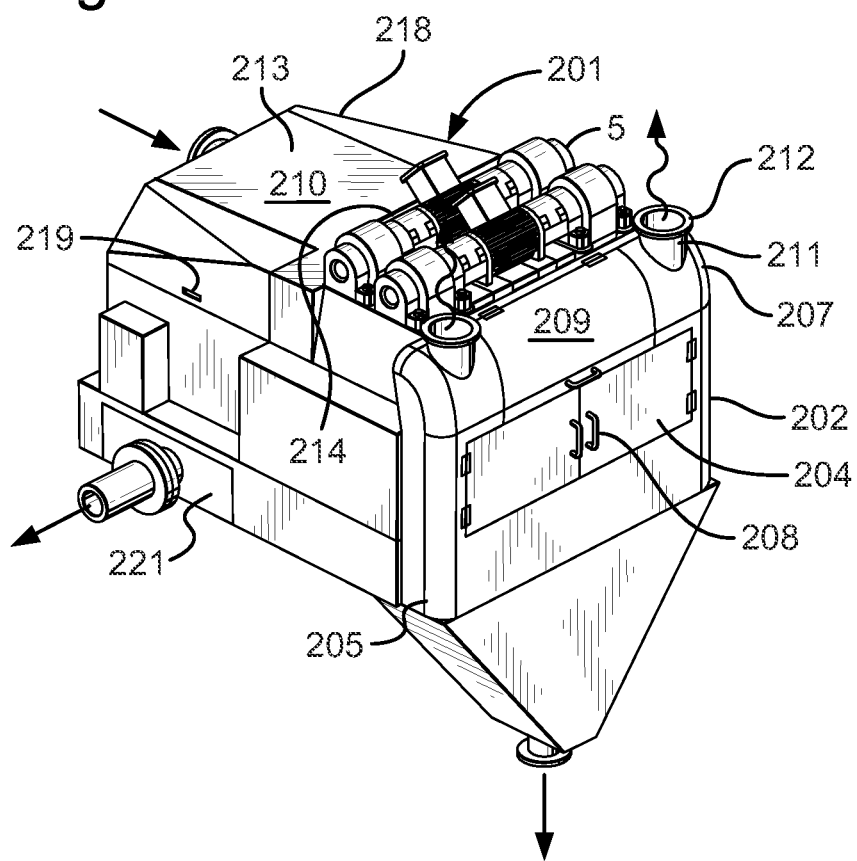

APPARATUS AND METHOD FOR SEPARATING SOLIDS FROM A SOLIDS LADEN DRILLING FLUID

CROSS-REFERENCE TO RELATED APPLICATION

This application claims the benefit of GB Patent Application No. 1112193.6, filed on Jul. 15, 2011, the entire contents of which are hereby incorporated by reference.

BACKGROUND

The invention relates to an apparatus and method for separating solids from a solids laden liquid and particularly, but not exclusively an apparatus and method for separating solids from a solids laden drilling mud.

In the drilling of a borehole in the construction of an oil or gas well, a drill bit is arranged on the end of a drill string, which is rotated to bore the borehole through a formation. A drilling fluid known as "drilling mud" is pumped through the drill string to the drill bit to lubricate the drill bit. The drilling mud is also used to carry the cuttings produced by the drill bit and other solids to the surface through an annulus formed between the drill string and the borehole. The density of the drilling mud is closely controlled to inhibit the borehole from collapse and to ensure that drilling is carried out optimally. The density of the drilling mud affects the rate of penetration of the drill bit. By adjusting the density of the drilling mud, the rate of penetration changes at the possible detriment of collapsing the borehole. The drilling mud may also carry lost circulation materials for sealing porous sections of the borehole. The acidity of the drilling mud may also be adjusted according to the type of formation strata being drilled through. The drilling mud contains inter alia expensive synthetic oil-based lubricants and it is normal therefore to recover and re-use the used drilling mud, but this requires inter alia the solids to be removed from the drilling mud. This is achieved by processing the drilling mud. The first part of the process is to separate the solids from the solids laden drilling mud. This is at least partly achieved with a vibratory separator, such as those shale shakers disclosed in U.S. Pat. No. 5,265,730, WO 96/33792 and WO 98/16328. Further processing equipment such as centrifuges and hydrocyclones may be used to further clean the mud of solids. The solids are covered in contaminates and residues. It is not uncommon to have 30 to 100 $m^3$ of drilling fluid in circulation in a borehole.

The resultant solids, known herein as "drill cuttings" are processed to remove substantially all of the residues and contaminates from the solids. The solids can then be disposed of in a landfill site or by dumping at sea in the environment from which the solids came. Alternatively, the solids may be used as a material in the construction industry or have other industrial uses.

Shale shakers generally comprise an open bottomed basket having one open discharge end and a solid walled feed end. A number of rectangular screens are arranged over the open bottom of the basket. The basket is arranged on springs above a receptor for receiving recovered drilling mud. A skip or ditch is provided beneath the open discharge end of the basket. A motor is fixed to the basket, which has a drive rotor provided with an offset clump weight. In use, the motor rotates the rotor and the offset clump weight, which causes the basket and the screens fixed thereto to shake. Solids laden mud is introduced at the feed end of the basket on to the screens. The shaking motion induces the solids to move along the screens towards the open discharge end. Drilling mud passes through the screens. The recovered drilling mud is received in the receptor for further processing and the solids pass over the discharge end of the basket into the ditch or skip.

The screens are generally of one of two types: hook-strip; and pre-tensioned.

The hook-strip type of screen comprises several rectangular layers of mesh in a sandwich, usually comprising one or two layers of fine grade mesh and a supporting mesh having larger mesh holes and heavier gauge wire. The layers of mesh are joined at each side edge by a strip which is in the form of an elongate hook. In use, the elongate hook is hooked on to a tensioning device arranged along each side of a shale shaker. The shale shaker further comprises a crowned set of supporting members, which run along the length of the basket of the shaker, over which the layers of mesh are tensioned. An example of this type of screen is disclosed in GB-A-1,526,663. The supporting mesh may be provided with or replaced by a panel having apertures therein.

The pre-tensioned type of screen comprises several rectangular layers of mesh, usually comprising one or two layers of fine grade mesh and a supporting mesh having larger mesh holes and heavier gauge wire. The layers of mesh are pre-tensioned on a rigid support comprising a rectangular angle iron frame and adhered thereto. The screen is then inserted into C-channel rails arranged in a basket of a shale shaker. An example of this type of screen is disclosed in GB-A-1,578,948 and an example of a shale shaker suitable for receiving the pre-tensioned type screens is disclosed in GB-A-2,176,424.

Drilling rigs often have space restrictions for mud processing equipment, particularly, but not exclusively on off-shore drilling rigs. Shale shakers have a foot print defined by a skid. Instead of having separate scalping shakers and primary screening shakers, shale shakers may incorporate a scalping deck and a primary screening deck to reduce the number of skids required on a drilling rig. An example of such a shale shaker is the VSM 300® supplied by NATIONAL OILWELL VARCO®. Shale shakers may include multiple primary screening decks inter alia to screen more solids laden drilling fluid per skid. Furthermore, primary, secondary and tertiary decks each with different screening material thereon may be incorporated on a single skid to inter alia provide a filtered drilling fluid with finer solids therein or to filter out graded solids for re-circulating in the well.

Solids laden drilling fluid may have chemicals therein which give off noxious fumes, fumes detrimental to the environment and fumes which may potentially be explosive. Such fumes may include hydrogen sulphide and oil vapours. Accordingly, it is often desirable to remove or contain such fumes. It is also advantageous to provide a separator which operates at low noise levels to comply with health and safety legislation. It is also advantageous to have a simple reliable separator to inhibit down-time for maintenance and repair.

It is advantageous to use fine-meshed filters to filter very small particles, for example of a size in the range of 50-200μ or more, without the filtering device clogging up with the small particles. However, it is the fine-meshed filters in particular that are prone to such undesired clogging. It is preferable in certain circumstances to retain particles, for example of a particle size in the range of 50-60μ or larger, by means of a filter.

It is known to house shale shakers in rooms on or near derricks of a drilling rig. These rooms are known as shaker rooms. A ventilation system may be used in such shaker rooms to draw off fumes given off by the solids laden drilling fluid when being processed by the shale shakers.

US 2008/0078699 discloses a shale shaker for separating solids from solids laden drilling mud, the shale shaker comprising a basket with a fume hood arranged thereon.

WO 2006/098638 discloses an apparatus for separating solids from solids laden drilling fluid, the apparatus comprising an inlet screen and upper and lower horizontal endless belt screen cloths energized with acoustic pulses, the endless belt screen cloths having a screen cleaning system using jets of air and the endless belt screen cloth having a discharge end and a negative pressure ventilation system thereabove.

The inventors have observed that the quantity of fumes given off by the shale shaker is inter alia related to the screening area of the screens in the shale 15 shakers. Thus with the popularization of shale shakers with multiple-decks, more fumes are given off per skid. The inventors also observed that there is a need for a more efficient apparatus and method for drawing off fumes produced by the shale shakers.

SUMMARY

According to the present invention, there is provided an apparatus for separating solids from solids laden drilling fluid, the apparatus comprising a skid and a basket resiliently suspended thereto and a vibratory mechanism to vibrate the basket, the basket having at least one screen deck for receiving at least one screen, the basket having a feed end at which solids laden drilling fluid is introduced and a discharge end at which solids are discharged through a solids discharge opening, the apparatus further comprising a hood encompassing at least a discharge end of the basket and at least one extraction outlet arranged at the discharge end to remove fume laden air from the basket. Such fumes may include hydrogen sulphide and oil vapours.

There is also provided an apparatus for separating solids from solids laden drilling fluid, the apparatus comprising a skid and a basket resiliently suspended thereto and a vibratory mechanism to vibrate said basket, the basket having at least one screen deck for receiving at least one screen, the basket having a feed end at which solids laden drilling fluid is introduced and a discharge end at which solids are discharged through a solids discharge opening, the apparatus further comprising a hood encompassing at least a discharge end of said basket and at least one extraction outlet arranged at said discharge end to remove fume laden air from the basket, the apparatus further comprising a sump arranged beneath said basket said sump having a sump discharge opening, wherein the at least one replacement air opening is the sump discharge opening supplying replacement air to replace fume laden air removed through said at least one extraction outlet.

Preferably, the hood is a complete housing, advantageously the housing encompasses a substantial portion of the basket and preferably all of the basket, having at least one replacement air opening sized to facilitate control of flow of replacement air to replace fume laden air removed through the at least one extraction outlet. The complete housing needn't be completely air tight and may have a few small gaps allowing a small amount of air to pass from the atmosphere into the complete housing. Negative pressure induced by suction through the extraction outlet ensures that air is sucked in through any small gap in the housing and does not allow fume laden air to escape. Preferably, the complete housing covers the feed end of the basket up to the base of the vibratory mechanism arranged on the discharge end of the basket, enclosing the sides of the basket and fixed but not necessarily, although advantageously, sealed 1 to the skid on which the shaker is mounted. The complete housing also encloses the discharge end of the basket and a void above the trough in which the solids fall with extraction outlets arranged thereabove and preferably the extraction outlets at a higher level than the top screen deck of the basket. Preferably, the hood extends over the entire basket of shaker to inhibit fumes escaping the shale shaker.

Advantageously, the replacement air opening is arranged underneath the at least one screen deck and at a feed end of the basket, and in a multiple screen deck arrangement, under the lowermost screen deck. This is preferable, such that at least a large part of the replacement air is through, around and over the screens in the screen decks, thereby evacuating fume laden air from the entire basket.

Preferably, a sump is arranged beneath the basket the sump having a sump discharge opening, wherein the at least one replacement air opening is the sump discharge opening supplying replacement air to replace fume laden air removed through the at least one extraction outlet. Preferably, the hood is a complete housing, thus replacement air comes mainly from controlled sources, i.e. the sump discharge opening and preferably, the solids discharge opening. The sump outlet opening can control the flow of replacement air passing into the hood and may influence the rate of fume laden air being evacuated from the hood.

Advantageously, a solids removal apparatus for conveying solids away from the discharge end of the basket, wherein the at least one extraction outlet is arranged above the solids removal apparatus.

Preferably, the solids removal apparatus comprises a ditch or further comprise the outside of the foot print of the skid, preferably above a ditch located to catch the solids discharging from the discharge end of the shale shaker. Advantageously, the at least one extraction outlet is arranged in a top of the hood, drawing fumes vertically through a duct attached or integral with the at least one extraction outlet.

Preferably, the hood extends over the entire basket to inhibit fumes escaping the shale shaker. Advantageously, the hood comprises an opening about a base of the vibratory mechanism. Advantageously, the vibratory mechanism is mounted on top of the basket, preferably close to the discharge end of the basket. This enables the hood size to be kept to a minimum while still enclosing the basket and allowing access to the vibratory mechanism for inspection, repair and cooling. Advantageously, a seal is arranged between the base of the vibratory mechanism and the hood. Preferably, the seal is a bellows type seal, which allows relative movement between the basket and the hood. Preferably, the at least one extraction outlet is arranged above said discharge end and advantageously, the outside of the foot print of the skid, preferably above a ditch located to catch the solids discharging from the discharge end of the shale shaker. Advantageously, the at least one extraction outlet is arranged in a top of said hood, drawing fumes vertically through a duct attached or integral with the at least one extraction outlet.

Advantageously, the hood is fixed to the skid, allowing the basket to vibrate relative thereto. The hood may also be attached to any other static part of the shale shaker, such as the feed chute.

Preferably, the basket comprises a scalping deck and one or two primary decks spaced vertically one above the other. The primary decks may also be split horizontally into two sides, each having rails into which screens can be slid. The rails preferably use a pneumatic hose sealing arrangement, such as the arrangement produced and sold by NATIONAL OILWELL VARCO® under the trade mark PNEUMOSEAL™.

Preferably, the apparatus further comprises a ventilation system for drawing fume laden air through the at least one extraction outlet, such as a roots type fan for producing negative pressure to suck fume laden air from the hood enclosing the basket. The ventilation system may comprise an HVAC unit.

The present invention also provides a bank of shale shakers each shale shaker comprising a skid and a basket resiliently suspended thereto and a vibratory mechanism to vibrate the basket, the basket having at least one screen deck for receiving at least one screen, the basket having a feed end at which solids laden drilling fluid is introduced and a discharge end at which solids are discharged through a solids discharge opening, each shale shaker further comprising a hood encompassing at least a discharge end of the basket and at least one extraction outlet arranged at the discharge end to remove fume laden air from the basket, each at least one extraction outlet linked by a duct with a ventilation system for drawing fume laden air from each basket of each shale shaker.

The present invention also provides a bank of shale shakers each shale shaker comprising a skid and a basket resiliently suspended thereto and a vibratory mechanism to vibrate the basket, the basket having at least one screen deck for receiving at least one screen, the basket having a feed end at which solids laden drilling fluid is introduced and a discharge end at which solids are discharged through a solids discharge opening, each shale shaker further comprising a hood encompassing at least a discharge end of the basket and at least one extraction outlet arranged at the discharge end to remove fume laden air from the basket, the shale shaker having a sump arranged beneath said basket said sump having a sump discharge opening, wherein the at least one replacement air opening is the sump discharge opening supplying replacement air to replace fume laden air removed through said at least one extraction outlet, each at least one extraction outlet linked by a duct with a ventilation system for drawing fume laden air from each basket of each shale shaker.

The present invention also provides a method of separating solids from solids laden drilling mud using a shale shaker comprising a skid and a basket resiliently suspended thereto and a vibratory mechanism to vibrate said basket, the basket arranged over a sump, the basket having at least one screen deck having at least one screen, the basket having a feed end at which solids laden drilling fluid is introduced and a discharge end at which solids are discharged through a solids discharge opening, the shale shaker further comprising a hood encompassing at least a discharge end of said basket and at least one extraction outlet arranged at said discharge end, the method comprising the steps of drawing fume laden air from the basket through the at least one extraction outlet and replacement air drawn through said sump outlet.

The present invention also provides a method of separating solids from solids laden drilling mud using a shale shaker comprising a skid and a basket resiliently suspended thereto and a vibratory mechanism to vibrate the basket, the basket having at least one screen deck having at least one screen, the basket having a feed end at which solids laden drilling fluid is introduced and a discharge end at which solids are discharged through a solids discharge opening, the shale shaker further comprising a hood encompassing at least a discharge end of the basket and at least one extraction outlet arranged at the discharge end, the method comprising the steps of drawing fume laden air from the basket through the at least one extraction outlet. Preferably, the shale shaker comprising a sump and a sump outlet, wherein the method further comprises the step of drawing replacement air through the a sump outlet.

The method, system and apparatus of the invention may use any combination of the above features and steps.

Some shale shakers have screen decks and/or a basket which have an adjustable rake to alter the pool depth on the screens. The rake adjustment may be between five degrees downhill and twenty five degrees uphill, although more popularly up to seven or ten degrees. A hood of the present invention can be arranged around the basket with enough clearance to allow for such movement of the basket.

Preferably, replacement air flows in from the underside of the shale shaker, advantageously, through the skid, preferably, through a ditch located beneath the discharge end. Preferably, the replacement air is drawn up through a drilling fluids collection sump arranged beneath the basket.

BRIEF DESCRIPTION OF THE DRAWINGS

For a better understanding of the present invention, reference will now be made, by way of example, to the accompanying drawings, in which:

FIG. 1A shows a side view of a known apparatus for separating solids from solids laden drilling mud;

FIG. 1B shows a perspective view of the apparatus shown in FIG. 1A;

FIG. 1C shows a front view of the apparatus shown in FIG. 1A;

FIG. 2A shows a side view of an apparatus for separating solids from solids laden drilling mud in accordance with the present invention;

FIG. 3C shows a front view of the apparatus shown in FIG. 3A;

DETAILED DESCRIPTION

Figure 2B:
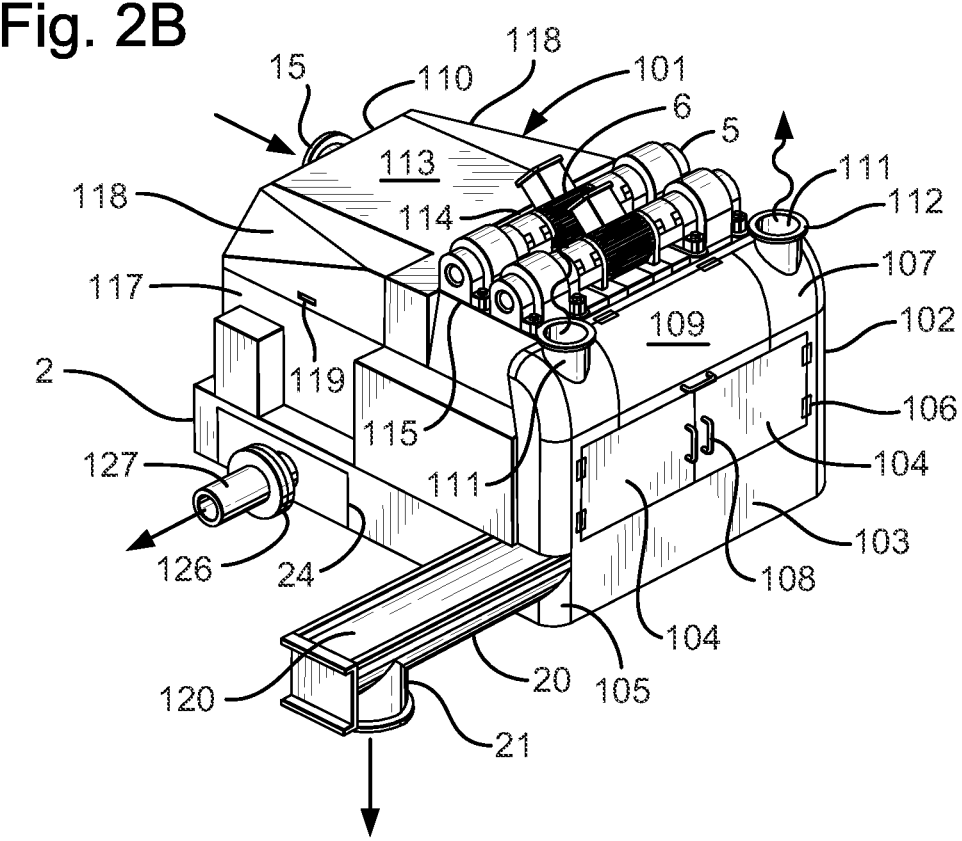
FIG. 2B shows a perspective view of the apparatus shown in FIG. 2A.

FIG. 1A to 1C show a known shale shaker for separating solids from a solid laden drilling mud, generally identified by reference numeral 1. The shale shaker 1 comprises a skid 2 which is fixed to a rig floor (not shown). A basket 3 is resiliently mounted on the skid 2 on four springs 4. A vibratory mechanism 5 is arranged on a top front portion of the basket 3. The vibratory mechanism comprises two motors 6, each having a shaft provided with offset clump weights (not shown). The motors 6 drive the shafts rotating the offset clump weights to induce an oscillating motion to the basket 3. The skid 2 is substantially isolated from the oscillations by the springs 4. A scalping deck 7 and upper and lower primary decks 8 and 9 are arranged in the basket 3. The scalping deck 7 is provided with rails 10 into which scalping screens are located (not shown). The scalping deck may extend the complete width of the basket 3 or part thereof. Upper and lower primary screen decks 8 and 9 each have two sets of rails 11, 12 and 13, 14 arranged next to each other in the same plane, each set for receiving primary screens (not shown). The scalping deck 7 is arranged at an uphill angle of preferably minus 2 to plus three and advantageously one degree from the feed end to the discharge end of the basket and the upper and lower primary decks 8 and 9 are arranged at an uphill angle of between two and ten degrees and preferably seven degrees.

The primary screens (not shown) on the upper and lower primary decks may include screening material of the same mesh grade, which would generally be used if the upper and lower primary decks 8 and 9 were used in a parallel mode or the screening material used in the lower screen deck may be of a finer mesh grade, which would generally be used if the upper and lower screen decks were used in a series mode. Parallel and series mode can be selected by changing the flow paths of the underflow of solids laden drilling fluid from the scalping deck and the underflow of drilling fluid from the upper primary deck.

A feed chute 15 is arranged above the rear of the basket 3 at a feed end 16. In use, solids laden drilling fluid flows through the feed chute 15 on to scalping screens (not shown) in the scalping deck 7. Large solids are conveyed inter alia by the motions induced in the basket 3 by the vibratory mechanism 5 to a discharge end of the basket 3. Scalped solids laden drilling mud flows through the scalping deck on to a flow back pan 18 to the rear of the basket and is directed on to the upper and lower primary decks 8 and 9 in parallel mode or solely to upper primary deck 8 in series mode, as desired. Ponds of drilling mud form on each of the upper and lower primary decks 8 and 9. Oscillatory motions induced in the screens in the primary decks cause solids to "walk out" of the ponds towards and over a discharge end 17 of the basket 3.

The discharged solids fall into a ditch opening 19 of ditch 20 or other conveyor or conveying means (not shown). The ditch 20 has an auger (not shown) running therealong to move the solids to a discharge chute 21. A grate 22 is seated over the ditch 20 to inhibit fouling of the auger (not shown) in the ditch 20.

Screened drilling mud flows through screens in the upper and/or lower primary decks 8 and 9 and into a sump 23. The sump 23 has an sump opening 24 through which screened drilling mud can flow back to a mud pit or on to be further processed.

Figure 2C:
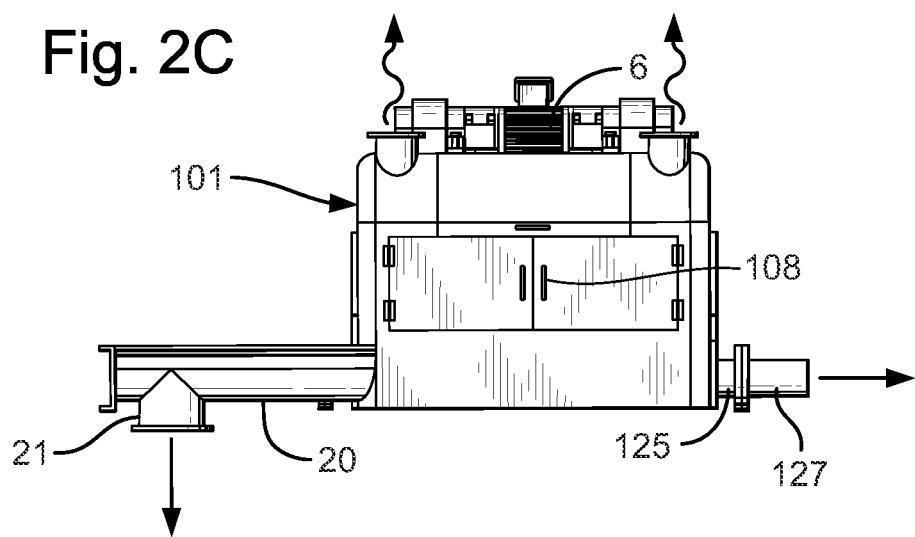
FIG. 2C shows a front view of the apparatus shown in FIG. 2A.

FIGS. 2A to 2C show the shale shaker in accordance with the present invention. A shale shaker such as the shale shaker shown in FIG. 1A to 1C is shrouded by a hood generally identified by reference numeral 101. Reference will now be made to FIGS. 2A to 2C with further reference to parts shown in FIGS. 1A to 1C. The hood 101 comprises a front cover 102 extending from the vibratory mechanism 5 at the top of the basket to the bottom of the skid 2 covering the ditch 20 across the width of the skid 2. The front cover 102 has a vertical end wall 103 with an access opening therein covered by access doors 104 hinged on hinges 106 at each outer side, with handles 108 provided to facilitate opening of the access doors 104. Curved side portions 105 wrap around the ditch opening 19 to front 17 of the basket 3. A top curved portion 107 joins the vertical wall 103 to the rear cover 110. The top curved portion 107 has a fume duct outlet 111 located at each side. Each fume duct outlet 111 is provided with a flange 112 for connecting to an air removal system such as an HVAC system. A curved access hatch 109 is provided in a top center portion of the front cover 102.

The rear cover 110 has a top cover 113 extending from the rear of the basket 3 over the feed chute 15 and the top of the basket to meet the top of the front cover 102. The hood 101 is spaced from the basket 3 to allow the basket 3 to oscillate within the hood 101. An opening 114 is provided in the top cover 103 to allow the vibratory mechanism to project therethrough. An elastomeric bellows type seal 115 is arranged between the edge of the top cover defining the opening 114 and a plate 116 on which the vibratory mechanism 5 is seated. Walls 117 are arranged between the outer perimeter of the skid 2 and the outer perimeter of the top cover 113. A face-to-face seal is used between the walls 117 and the outer perimeter of the skid 2. Hatches 118 are provided between the walls 117 and the top cover to allow visual inspection and maintenance of the basket 3 therewithin. A handle 119 is provided to facilitate opening of the hatch 118. A rear portion end wall (not shown) is provided on the rear end of the shale shaker attached to the skid 2 to complete the housing shrouding the basket 3.

A cover plate 120 is arranged over the portion of the ditch 20 extending beyond the side of the front cover 103 to inhibit escape of fumes rising from solids in the ditch 20 and to control the quantity of replacement air flowing through the ditch 20.

A sump cover plate 121 is placed over sump opening 24 in the rear portion of the skid towards the rear of the shale shaker. The sump cover plate 121 is provided with a sump discharge pipe stub 125 having a flange 126 for connection to a sump discharge pipe or hose 127 for returning drilling mud to a mud system, holding tank or mud pit (not shown). The sump discharge pipe stub 125 may have an internal diameter of approximately 250 mm (10 inches). The sump discharge pipe stub 125 is located close to the rear of the screens in the upper and lower screen decks 8 and 9. The bottom of the skid 2 is preferably provided with a plate to inhibit air from rising through the shale shaker although a solid floor on which the shale shaker may be placed may be sufficient to inhibit air from flowing from under the shale shaker in an uncontrolled way. The plate may have an opening therein preferably at a rear end, to control the flow of replacement air through the basket 3 of the shale shaker.

Solids augured along ditch 20 fall through outlet 21 which may be provided with a flange for connection to another pipe or allow solids to discharge directly into a solids movement apparatus such as a positive pneumatic pressure conveying system such as the system provided by NATIONAL OILWELL VARCO® under the trade mark FREEFLOW™.

In use, solids laden drilling mud flows through the feed chute 15 into the basket 3 on to screens in the scalping deck 7. Large solids are scalped-off, passing over the scalping deck 7 and into ditch 20. Drilling mud having small solids therein passes on to fine screens in the upper and lower decks 8 and 9, as previously described. Screened solids pass over the upper and lower decks into the ditch 20, although a graded portion may be returned to the sump 23. Screened drilling mud passes through the fine screens into the sump 23. Fumes may develop as a result of the fluid being spread thinly across the screens, increasing the surface area open to the atmosphere within the basket 3. Furthermore, the drilling mud may return hot from the well, up to approximately 120 Celsius and with further energy imparted to the drilling mud, the drilling mud may be kept hot. Thus there is a likelihood of fumes rising from the drilling mud on the screens. The fumes flow naturally or are sucked under negative pressure through the fume duct outlets 111 into an air conditioning system such as an HVAC system (not shown) for safe removal of the fumes from the shale shaker. Replacement air is drawn through the ditch 20 and through the sump discharge pipe 127. It should be noted that the sump discharge pipe 127 is sized so that drilling mud flows therethrough with a large head of air thereabove, thus a large diameter pipe is used. Replacement air flows from the sump discharge pipe 127 and is drawn across the screens in the upper and lower decks 8 and 9 to the space defined by the ditch 20 and front cover 103 allowing fumes to be collected and drawn off into the fume duct outlets 111. Any fumes rising from solids within the ditch 20 will flow with the replacement air into the space enclosed by the front cover 103 and rise into fume duct outlets 111 and into the air conditioning system (not shown).

Figure 3A:
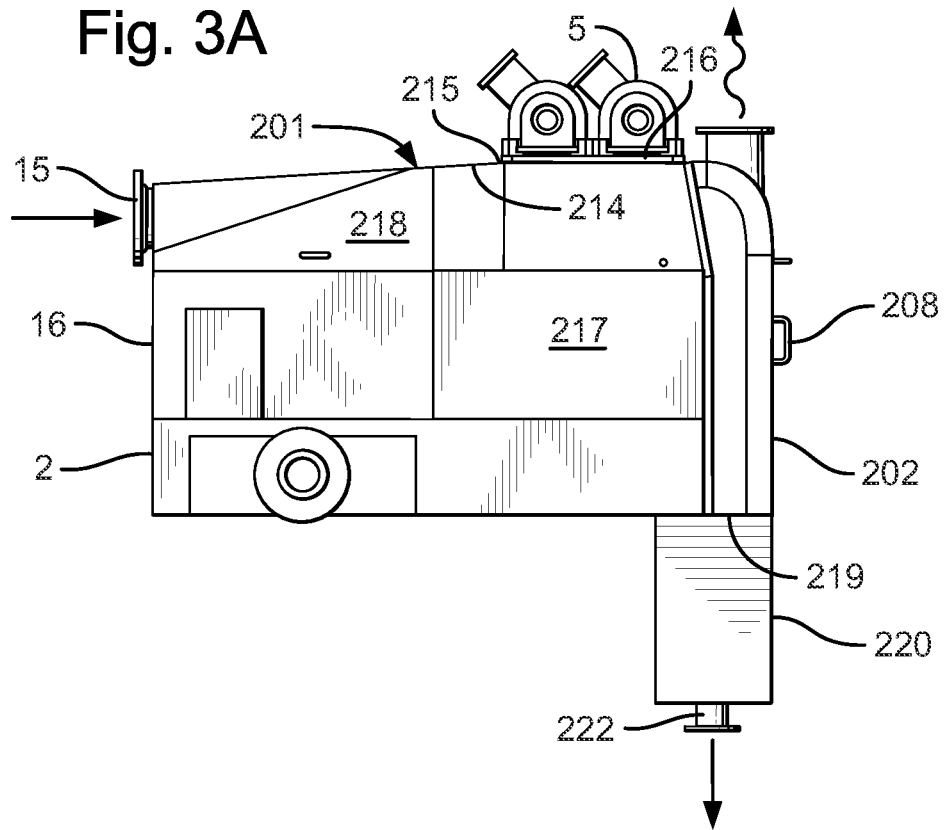
FIG. 3A is a side view of an apparatus for separating solids from solids laden drilling mud in accordance with the present invention.
Figure 3B:
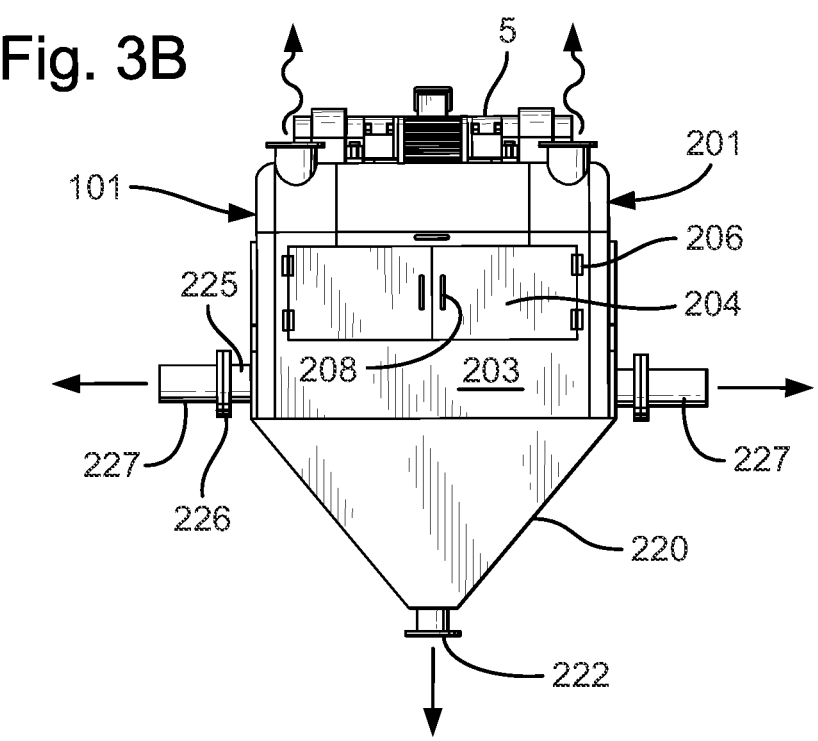
FIG. 3B shows a front view of the apparatus shown in FIG. 3A.

FIGS. 3A to 3C show the shale shaker in accordance with the present invention. Reference will now be made to FIGS. 3A to 3C with further reference to parts shown in FIGS. 1A to 1C. A shale shaker such as the shale shaker shown in FIGS. 1A to 1C is shrouded by a hood generally identified by reference numeral 201, save for a solids collection chute 220 in place of the ditch 20. The hood 201 comprises a front cover 202 extending from the vibratory mechanism 5 at the top of the basket 3 to the bottom of the skid 2 covering the ditch 20 across the width of the skid 2. The front cover 202 has a vertical end wall 203 with an access opening therein covered by access doors 204 hinged on hinges 206 at each outer side, with handles 208 provided to facilitate opening of the access doors 204. Curved side portions 205 wrap around a solids collection chute opening 219 to front 17 of the basket 3. A top curved portion 207 joins the vertical wall 203 to rear cover 210. The top curved portion 207 has a fume duct outlet 211 located at each side. Each fume duct outlet 211 is provided with a flange 212 for connecting to an air removal system such as an HVAC system (not shown). A curved access hatch 209 is 15 provided in a top center portion of the front cover 202.

The rear cover 210 has a top cover 213 extending from the rear of the basket 16 over the feed chute 15 and the top of the basket 3 to meet the top of the front cover 202. The hood 201 is spaced from the basket 3 to allow the basket 3 to oscillate within the hood 201. An opening 214 is provided in the top cover 213 to allow the vibratory mechanism to project therethrough. An elastomeric bellows type seal 215 is arranged between the edge perimeter of the top cover defining the opening 214 and a plate 216 on which the vibratory mechanism 5 is seated. Walls 217 are arranged between the outer perimeter of the skid 2 and the outer perimeter of the top cover 213. A face-to-face seal is used between the walls 217 and the outer perimeter of the skid 2. Hatches 218 are provided between the walls 217 and the top cover 213 to allow visual inspection and maintenance of the basket 3 therewithin. A handle 219 is provided to facilitate opening of the hatch 218. A rear cover end wall (not shown) is provided on the rear end 16 of the shale shaker attached to the skid 2 to complete the housing shrouding the basket 3.

A sump cover plate 221 is placed over sump opening 24 in the rear portion of the skid towards the rear of the shale shaker. The sump cover plate 221 is provided with a sump discharge pipe stub 225 having a flange 226 for connection to a sump discharge pipe or hose 227 for returning drilling mud to a mud system, holding tank or mud pit (not shown). The sump discharge pipe stub 225 may have an internal diameter of approximately 250 mm (10 inches). The sump discharge pipe stub 225 is located close to the rear of the screens in the upper and lower screen decks 8 and 9. The bottom of the skid 2 is preferably provided with a plate to inhibit air from rising through the shale shaker although a solid floor on which the shale shaker may be placed may be sufficient to inhibit air from flowing from under the shale shaker in an uncontrolled way. The plate may have an opening therein preferably at a rear end, to control the flow of replacement air through the basket 3 of the shale shaker.

The solids collection chute 220 converges to an outlet 222 which may be provided with a flange for connection to another pipe or to allow solids to discharge directly into a solids movement apparatus, such as a positive pneumatic pressure conveying system, such as the system provided by NATIONAL OILWELL VARCO® under the trade mark FREEFLOWM™. The solids collection chute 220 may be designed to achieve mass flow of the solids into the outlet 222 to inhibit bridging or rat holing of the solids.

In use, solids laden drilling mud flows through the feed chute 15 into the basket 3 on to screens in the scalping deck 7. Large solids are scalped-off, passing over the scalping deck 7 and into solids collection chute 220. Drilling mud having small solids therein passes on to fine screens in the upper and lower decks 8 and 9, as previously described. Screened solids pass over the upper and lower decks into the solids collection chute 220, although a graded portion may be returned to the sump 23. Screened drilling mud passes through the fine screens into the sump 23. Fumes may develop as a result of the fluid being spread thinly across the screens, increasing the surface area open to the atmosphere within the basket 3. Furthermore, the drilling mud may return hot from the well, up to approximately 120 Celsius and with further energy imparted to the drilling mud, the drilling mud may be kept hot. Thus there is a likelihood of fumes rising from the drilling mud on the screens. The fumes flow naturally or are sucked under negative pressure through the fume duct outlets 211 into an air conditioning system such as a HVAC system (not shown) for safe removal of the fumes from the shale shaker. Replacement air is drawn through the sump discharge pipe 227 and the solids collection chute 220. It should be noted that the sump discharge pipe 227 is sized so that drilling mud flows therethrough with a large head of air thereabove, thus a large diameter pipe is used. Replacement air flows from the sump discharge pipe 227 and is drawn across the screens in the upper and lower decks 8 and 9 to the space defined by the solids collection chute 220 and front cover 202 allowing fumes to be collected and drawn off into the fume duct outlets 211. Any fumes rising from solids within the solids collection chute 220 will rise into fume duct outlets 211 and into the air conditioning system (not shown).

The flow rate of air an fumes being drawn off through the fume duct outlets is between 0.5 and 3 cubic meters per second, and preferably between one and two cubic meters per second, and most preferably one cubic meter per second.

A bank of shale shakers shown in FIGS. 2A to 3C may be used on a drilling rig, with each of the fume duct outlets 111,211 linked by at least one duct with a ventilation system such as an HVAC system, using a screw fan or roots type fan to create negative pressure to draw fume laden air from the hood enclosing the basket.

What is claimed is:

1. An apparatus for separating solids from solids laden drilling fluid, the apparatus comprising:
    a skid;
    a basket resiliently suspended to the skid, the basket having at least one screen deck for receiving at least one screen, the basket having a feed end at which the solids laden drilling fluid is introduced and a discharge end at which the solids are discharged through a solids discharge opening,
    a vibratory mechanism to vibrate the basket;
    a hood encompassing at least the discharge end of the basket;
    at least one extraction outlet arranged at the discharge end at one end of the hood to remove fume laden air from the basket; and
    a sump arranged beneath the basket, the sump having a sump discharge opening at an opposite end of the hood from the discharge end to draw in the fume laden air from the basket;
    wherein replacement air discharged through the at least one extraction outlet is passed through the sump discharge opening and the solids discharge opening to supply the replacement air to replace the fume laden air removed through the at least one extraction outlet.

2. The apparatus as claimed in claim 1, wherein the hood is a complete housing having at least one replacement air opening sized to facilitate control of flow of the replacement air to replace the fume laden air removed through the at least one extraction outlet.

3. The apparatus as claimed in claim 2, wherein the at least one replacement air opening is arranged underneath the at least one screen deck and at the feed end of the basket.

4. The apparatus as claimed in claim 1, further comprising a solids removal apparatus for conveying the solids away from the discharge end of the basket, wherein the at least one extraction outlet is arranged above the solids removal apparatus.

5. The apparatus as claimed in claim 4, wherein the solids removal apparatus comprises a ditch.

6. The apparatus as claimed in claim 1, wherein the at least one extraction outlet is arranged in a top of the hood, drawing the fume laden air vertically through a duct extending from the at least one extraction outlet.

7. The apparatus claimed in claim 1, wherein the hood extends over the entire basket to inhibit the fume laden air from escaping the apparatus for separating the solids from the solids laden drilling fluid.

8. The apparatus claimed in claim 1, wherein the hood comprises an opening about a base of the vibratory mechanism.

9. The apparatus as claimed in claim 8, wherein a seal is arranged between the base of the vibratory mechanism and the hood.

10. The apparatus as claimed in claim 1, wherein the hood is fixed to the skid, allowing the basket to vibrate relative thereto.

11. The apparatus as claimed in claim 1, wherein the basket comprises a scalping deck and two primary decks spaced vertically one above the other.

12. The apparatus as claimed in claim 1, further comprising a ventilation system for drawing the fume laden air through the at least one extraction outlet.

13. A bank of shale shakers each shale shaker comprising
a skid;
a basket resiliently suspended to the skid, the basket having at least one screen deck for receiving at least one screen, the basket having a feed end at which solids laden drilling fluid is introduced and a discharge end at which solids are discharged through a solids discharge opening;
a vibratory mechanism to vibrate the basket;
a hood encompassing at least the discharge end of the basket and at least one extraction outlet arranged at the discharge end at one end of the hood to remove fume laden air from the basket; and
a sump arranged beneath the basket, the sump having a sump discharge opening at an opposite end of the hood from the discharge end to draw in the fume laden air from the basket;
wherein replacement air discharged through the at least one extraction outlet is passed through the sump discharge opening and the solids discharge opening to supply the replacement air to replace the fume laden air removed through the at least one extraction outlet, each of the at least one extraction outlets linked by a duct with a ventilation system for drawing the fume laden air from each of the baskets of each of the shale shakers.

14. A method of separating solids from solids laden drilling fluid, comprising:
providing a shale shaker comprising:
a skid;
a basket resiliently suspended to the skid, the basket arranged over a sump, the basket having at least one screen deck having at least one screen, the basket having a feed end at which the solids laden drilling fluid is introduced and a discharge end at which the solids are discharged through a solids discharge opening;
a vibratory mechanism to vibrate the basket;
a hood encompassing at least the discharge end of said basket and at least one extraction outlet arranged at said discharge end;
drawing fume laden air from the basket through the at least one extraction outlet at one end of the hood; and
drawing replacement air through a sump discharge opening of said sump at an opposite end of the hood from the at least one extraction outlet and through the sump discharge opening and the solids discharge opening to supply the replacement air to replace the fume laden air removed through the at least one extraction outlet.

15. The method of claim 14, further comprising vibrating the basket with the vibratory mechanism.

16. The method of claim 14, further comprising introducing the solids laden drilling fluid into the feed end and discharging the solids through the solids discharge opening.

* * * * *